Dec. 6, 1966     G. MEWS     3,290,669
CONTROL DEVICE FOR SIGNALLING A PREDETERMINED TIME
PERIOD OF FLOW OF CURRENT BETWEEN TWO TERMINALS
Filed July 26, 1963     2 Sheets-Sheet 1

INVENTOR
Günter Mews
BY Michael S. Striker
Attorney

Dec. 6, 1966          G. MEWS          3,290,669
CONTROL DEVICE FOR SIGNALLING A PREDETERMINED TIME
PERIOD OF FLOW OF CURRENT BETWEEN TWO TERMINALS
Filed July 26, 1963                    2 Sheets-Sheet 2
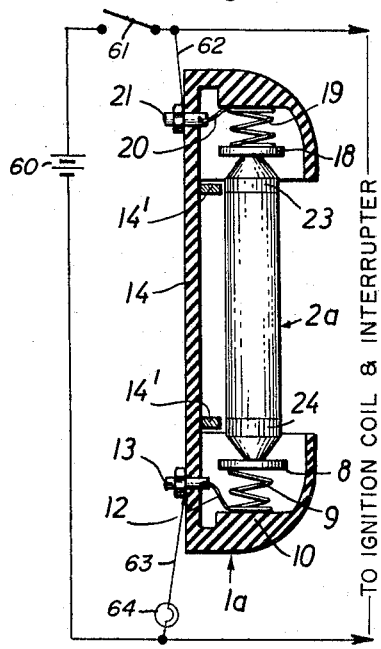
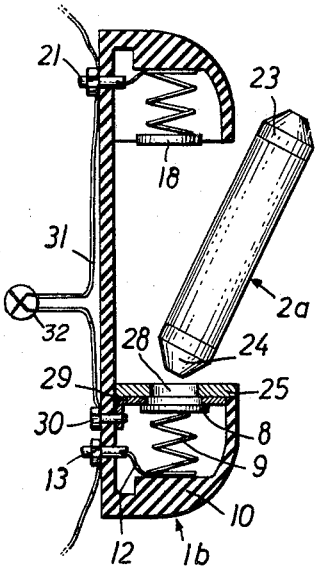
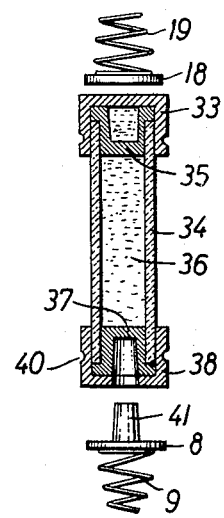
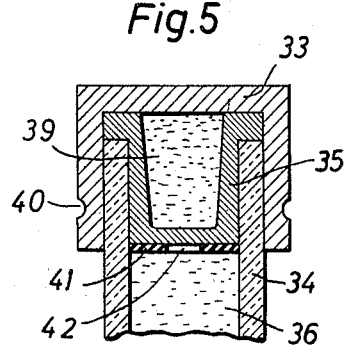
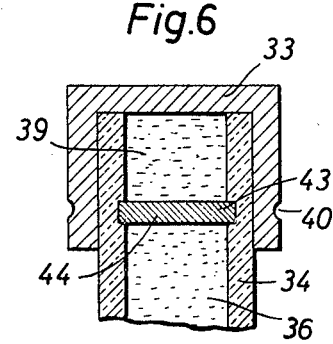
INVENTOR
Günter Mews
BY Michael S. Striker
   Attorney

United States Patent Office 3,290,669
Patented Dec. 6, 1966

3,290,669
CONTROL DEVICE FOR SIGNALLING A PREDETERMINED TIME PERIOD OF FLOW OF CURRENT BETWEEN TWO TERMINALS
Günter Mews, Rolandstrasse 39b,
Bad Godesberg, Germany
Filed July 26, 1963, Ser. No. 297,794
Claims priority, application Germany, July 28, 1962,
M 53,726; Aug. 2, 1962, M 42,072; Mar. 21, 1963,
M 56,193
16 Claims. (Cl. 340—267)

The present invention relates to a control device for signalling a predetermined time period of flow of current between two terminals and more specifically to a control device for signalling the expiration of a time interval between necessary servicing of a machine, such as an automobile or the like.

Proper maintenance practice requires that machines such as motor vehicles or the like are inspected and serviced at certain intervals, for instance in the operation of motor vehicles it is standard practice to inspect and service such motor vehicles at intervals between 2,500 and 10,000 kilometers of operation which corresponds approximately, assuming a medium travelling speed of 50 kilometers per hour, to time intervals of actual operation between 50 and 200 hours. If proper records are not held by the operator of the vehicle, proper servicing thereof at predetermined intervals of operation may be neglected to the detriment of the useful life of the machine. The same problem arises also with other machines which are operated at irregular intervals and should be serviced at predetermined intervals of a total operation.

It is an object of the present invention to provide a control device for better control and surveillance of the proper servicing of motor vehicles, explosion motors and other machines which are operated at irregular intervals, that is for signalling the expiration of a time interval between necessary servicing of the machine.

It is a further object of the present invention to provide for such a control device which is exact and reliable in operation and which is constructed of only few and simple parts so that the device can be manufactured at very reasonable cost and will operate trouble-free during extended operation.

The control device according to the present invention is operated by electric current and this current may be taken from a working circuit of the machine, for instance from the ignition circuit of a motor vehicle, or this current may be produced by an auxiliary circuit.

Basically, the control device of the present invention includes an electric circuit adapted to be connected to two terminals of a current supply, a chemical component cooperating with the current flowing through the circuit so that the current causes gradual movement of the material of the component in one direction, and means cooperating with the component to produce a signal after a predetermined amount of material has thus been moved.

This movement of the material may be caused by electrolytic action of the current flowing through the circuit, that is an electrolytically dissolvable component, for instance a metal and preferably copper component in the circuit, may be electrolytically dissolved and the control device is constructed in such a manner that after electrolytically dissolving this component a signal noticeable to the operator of the machine will be produced.

The gradual movement of the material of a component in the circuit may however also be produced by the heat developed as the current of the electrical circuit passes through a resistance wire. The control device of the present invention may, therefore, also include a resistance wire in the aforementioned electrical circuit which is surrounded by a meltable material, for instance stearin, which gradually melts as current flows through the resistance wire and the control device is constructed in this case in such a manner that the molten material flows in one direction so that, after melting of a predetermined amount of the material, a mark hidden at the start of the control cycle becomes visible.

Preferably the chemical component, whether of electrolytically dissolvable material, or of meltable material is enclosed in an indicator tube provided at opposite ends thereof with electrical contacts and in the interior thereof with means to carry current therethrough, and this indicator tube is preferably exchangeably mounted on a support including spaced resilient contacts which engage respectively the opposite contacts on the indicator tube.

The control device of the present invention may include an indicator tube having two chambers, at least one of which is made from transparent material, and which contains an easy colorable current conducting material which may be a liquid or which may be in paste form, or granulated, while the other chamber is filled with a coloring liquid, as for instance aniline color. This arrangement is made in such a manner that after a predetermined control interval an opening is created between the two chambers so that the coloring material may flow into the material in the first mentioned chamber to suddenly color the same and to give in this manner a signal visible to the operator.

Preferably the arrangement is made in such a manner that the first mentioned chamber of the indicator tube is filled with an electrolyte, whereas the second chamber is made from a metal capsule, for instance copper, which is filled with the coloring material, whereby the metal capsule is arranged to form the anode of the electrical circuit with a bottom portion of the capsule extending into the electrolyte of the first chamber. When current flows through the thus formed indicator tube the metal of the capsule will be gradually electrolytically dissolved so that after a predetermined time, depending on the amount of current flowing through the tube and depending on the thickness of the bottom portion of the capsule, the bottom portion will be dissolved so that the color contained therein will flow into the electrolyte, vividly color the same and give in this way a clearly visible signal to the operator of the machine. As mentioned before, the indicator tube is preferably exchangeable arranged in a support having resilient contacts so that after the indicator tube has produced the signal in the aforementioned manner it can be exchanged against a new indicator tube.

The two chambers of the indicator tube separated by a metal component, for instance copper, may also respectively contain two electrolytes of different concentration and conductivity so that after electrolytically dissolving the partition the two electrolytes will mix with each other to thereby reduce the resistance of the circuit of which the indicator tube forms a part. A pronounced change of this resistance may be produced especially if the chamber containing the electrolyte of low concentration is made considerably longer than the chamber containing the electrolyte of high concentration. Relay or other indicating means may be connected to the electrical circuit of which the indicator tube forms a part, which relay or indicator means may be constructed in such a manner to be actuated only when the resistance of the circuit is reduced by mixing the two electrolytes. Such a relay may also be used to automatically stop further operation of the machine when the relay is actuated.

Very exact results are obtained from this construction if the indicator tube has a cathode surface which has the same area exposed to the electrolyte as the anode forming partition. In such an arrangement the inner resistance produced by the components of the indicator tube will be substantially constant up to the breakdown of the anode forming partition after which the two electrolytes will mix and the resistance of the indicator tube will essentially change.

It is also possible to provide with this arrangement a coloring effect in the indicator tube by mixing a coloring agent to the electrolyte of high concentration so that this coloring agent will mix after breakdown of the partition with the electrolyte of low concentration and gives thereby a visible signal to the operator.

Instead of a color solution an indicator may also be used when the pH values of the two electrolytes are chosen in a predetermined manner so that a color change will occur after mixing of the two electrolytes.+

A further possibility to provide a color change after mixing of the two electrolytes is to formed colored ions from the anode material after mixing of the two electrolytes, which will especially occur if the anode material will not be deposited as compact body on the cathode but at least formed to a great extent of fine sediment.

When the signal is not produced by electrolytic action, but by the heat developed by the current flowing through the control circuit, the control device according to the present invention will preferably include an indicator tube having an upper and a lower chamber, communicating with each other through a restricted portion of the tube and in which a resistance wire extends at least through the upper chamber and is surrounded by meltable material for instance stearin. The upper chamber is preferably made from transparent material and on a wall portion thereof which faces away from the operator is provided a mark which at the start of the operation is hidden behind the meltable material and which becomes visible after the material gradually melts and flows from the upper chamber through the restricted opening into the lower chamber.

In this arrangement the resistance wire is preferably arranged concentrically in the upper chamber and it may also extend through both chambers. In such an arrangement the meltable material will first melt in the center of the chamber until finally also the material which abuts against the wall of the chamber will melt so that the mark on the rear wall of the chamber will be visible. Preferably the lower chamber is also formed from transparent material so that the gradual melting of the material may be noticed and the approximate time of operation may be estimated in this way even before the mark becomes visible.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 2 is a partially cross sectional view of a further embodiment and showing to an indicator tube held between resilient contacts of the support;

FIG. 3 is a partially cross sectional view of an embodiment similar to FIG. 2 and showing the indicator tube removed from the resilient contacts of the support;

FIG. 4 is a cross sectional view of a slightly modified indicator tube and showing also associated contacts;

FIG. 5 is a partial cross sectional view drawn to an enlarged scale and showing one end of a slightly modified indicator tube arrangement;

FIG. 6 is a partial cross sectional view similar to FIG. 5, drawn to an enlarged scale and showing a further modification of one end of the indicator tube.

Figure 7:
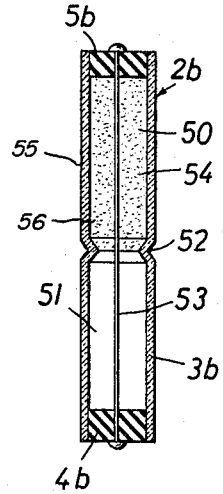
FIG. 7 shows a further modification of an indicator tube to be used in the control device according to the present invention.

The embodiments shown in FIGS. 1–6 show control devices or parts thereof in which the signal is produced by electrolytic action of the current, while FIG. 7 shows an indicator tube in which the signal is produced by thermal action of the current.

Figure 1:
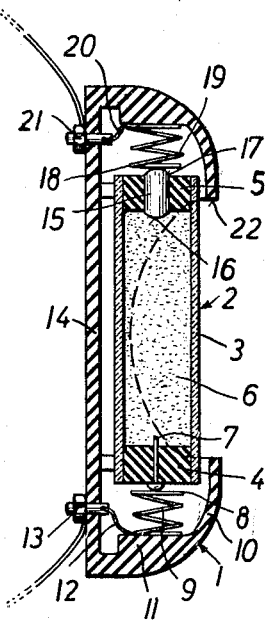
FIG. 1 is a longitudinal cross section through one embodiment of the control device according to the present invention.

Referring now to the drawings and more specifically to FIG. 1 it will be seen that the control device of the embodiment shown in FIG. 1 includes a support means 1 in which an exchangeable indicator tube 2 is supported. The indicator tube 2 includes a tubular member 3, preferably formed from transparent material, such as glass or transparent plastic, which is sealed at opposite ends thereof by plugs 4 and 5, thus defining in the interior of the tube 3 between the inner faces of the plugs 4 and 5 a chamber 6 which is filled with an electrolyte.+ A contact member 7 penetrates through the plug 4 in sealing engagement therewith and forms at the outer end thereof a contact surface which cooperates with a contact plate of a contact spring 9. The contact spring 9 is housed in the cap 10 of the housing or support means 1 and abuts with its lower end against a surface 11 of the cap. The contact spring 9 is connected by a conductor 12 with a connecting screw 13 which protrudes through the rear wall 14 of the support means 1. A metal capsule 15, which may be formed for instance from copper, protrudes through an opening formed in the plug 5 in sealing engagement with the latter so that a bottom portion 16 of the capsule 15 is in contact with the electrolyte in the chamber 6.

The top portion 17 of the capsule is in contact with a contact plate 18 fixed to one end of a contact spring 19, which in turn abuts with its other end against a surface of the upper cap of the support means 1 which extends transverse to the axis of spring 19. The contact spring 19 is connected by a conductor 20 to a connecting screw 21 which protrudes through the rear wall 14 of the support means. The capsule 15 forms the second chamber of the control device illustrated in FIG. 1 and is filled with a coloring agent, for instance aniline color.

The connecting screws 13 and 21 are connected into an electric circuit of the machine in which the control device of the present invention is to be used and this electric circuit may be the working circuit of the machine, for instance the ignition circuit of an explosion motor, or the electric circuit may be a separate control circuit which is energized every time the machine is in operation. Appropriate resistors not shown in the drawings may be connected into the circuit leading to the control device to regulate the voltage and current flowing through the control device. The device is connected into the circuit so that the contact member 7 forms the cathode and the metal capsule 15 the anode of the electrolytic circuit.

The current and voltage flowing through the control device is regulated in such a manner and the bottom portion 16 of the metal capsule 15 is formed with such a thickness that after a predetermined time period of current flow through the control device the bottom portion 16 will be completely dissolved so that the color contained in the capsule 15 will flow into the electrolyte contained

---

+ Is for instance the pH value of the electrolyte in the indicator tube less than 5 and rises after mixing with the second electrolyte to more than 8 or vice versa, curcuma, litmus or phenolphthalein may be used as a color changing indicator; in other, especially in lower ranges between 0 and 4 methyl violet and between 3 and 5 methyl orange is advisable.

+ As electrolyte may in all embodiments of the invention serve any solution known in the art as galvanic bath or any other acidic, alcaline or aqueous, not gassing solution of heavy metal salts, for instance of $CuSO_4$, $AgNO_3$, $K_3Cu(CN)_4$, $PbSO_4$. Its initial concentration may be chosen freely according to the desired conductivity. An electrolyte found satisfying consists of 11 parts $H_2SO_4$, 35 parts $CuSO_4$, 9 parts alcohol, distilled water up to 100.

in the chamber 6 to change thereby the color thereof and to give a visible signal to the operator of the machine.+ The control device is fastened to the machine, for instance to the control board of an automotive vehicle in such a manner by non-illustrated fastening means, so that the device will be in the field of viewing of the operator.

The electrolyte in the chamber 6 may be for instance copper sulfate in paste form or in granulated form or copper sulfate dissolved in water. Especially advantageous is the use of an electrolyte, e.g. a solution of $PbSO_4$, giving white flocculents together with $CuSO_4$ which slightly changes its color during operation so that this slight color change will be an indication of the proper working of the arrangement. It is also possible to include a lamp in the circuit which will indicate flow of current therethrough.

After the control device has provided in the manner as described above an optical signal by suddenly changing the color of the electrolyte, the indicator tube 2 thus used up, will have to be exchanged against a new indicator tube and such an exchange can be easily carried out for instance by pushing the indicator tube 2 in downward direction so that the top portion 17 of the capsule becomes located below the bottom rim 22 of the upper cap, thus compressing the lower contact spring 9 and by then tilting the upper end of the indicator tube outward of the upper cap and by finally removing the tube from the support means 1. A new indicator tube may afterwards be inserted into the support means in reverse manner.

FIGS. 2–6 illustrate further embodiments of control devices according to the present invention or parts thereof in which the signal is likewise produced by electrolytic action of the current flowing through the electrical circuit to which the control device is connected. Components of the control device embodiments shown in FIGS. 2–6 which are identical with components of the control device shown in FIG. 1 are indicated with identical reference numerals, whereas slightly modified components have been provided with identical reference numerals followed by a letter.

The control device illustrated in FIG. 2 includes also a support or housing 1a which differs from the housing shown in FIG. 1 only by the provision of two abutment members 14′ projecting forwardly from the rear wall 14 of the housing 1a to form respectively abutments for the contact plates 8 and 18 connected to the contact springs 9 and 19 in the manner as described before. The abutment members 14′ will therefore limit expansion of the springs 9 and 19 when the indicator tube 2a of the device resiliently held between the contact plates 8 and 18 is removed from the support 1a. The outer ends of the contact springs 9 and 19 are again respectively connected by wires 12 and 20 to the connecting screws 13 and 21 which protrude through the rear wall 14 of the support 1a. The indicator tube 2a is provided at opposite ends thereof with contact members 23 and 24 respectively engaging the contact plates 8 and 18 to make contact therewith.

The contact tube 2a of the embodiments of the control device illustrated in FIGS. 2–6 contains two chambers separated by an electrolytically dissolvable material, for instance copper and one of the chambers contains an electrolyte of high concentration and high conductivity, whereas the other of the chambers is filled with an electrolyte of low concentration and low conductivity. As mentioned before, during flow of current through the indicator tube of the embodiment illustrated in FIGS. 2–6, the separating partition will be electrolytically dissolved so that after breakdown of the partition the electrolytes in the two chambers will mix with each other to thereby reduce the overall resistance of the control circuit of which the indicator tube forms a part.

FIG. 4 shows a slightly modified indicator tube in cross section which differs from the indicator tube shown in FIGS. 2 and 3 only by a slight modification of the configuration of the contact members connected to opposite ends of the tube. While FIGS. 2 and 3 show contact members 23 and 24 which are of substantially frustoconical configuration, the contact members 33 and 38 shown in FIG. 4 are of substantially cyclindrical or cup-shape configuration. A cup-shape member 35, made from electrolytically dissolvable material for instance electrolytic copper, is pushed from below in the upper cup-shaped contact member 33, and cup 35 is provided at the upper rim thereof which abuts against the transverse wall of the cup-shaped contact member 33 with an outwardly projecting flange so as to provide between the cylindrical walls of members 33 and 35 an annular space into which the upper end of the plastic tube 34 is introduced. To tightly connect the tube to the contact member 33 an annular groove is preferably pressed into the cylindrical wall of this contact member to thus form a tight connection between contact member 33 and the upper end of the tube 34 and to press the latter tightly against the cylindrical wall of the cup 35. The lower portion of the indicator tube illustrated in FIG. 4 is constructed in a similar manner and includes an outer cup-shaped contact member 38 in which a cup 37, preferably also formed of electrolytic copper, is inserted in the same manner as the cup 35 is inserted into the contact member 33. The lower end of the plastic tube 34 protrudes into the annular space formed between members 37 and 38 and here too a ring groove 40 is pressed into the outer contact member 38 to provide a tight connection between the same and the lower end of the tube 34. The bottom wall of the contact member 38 is preferably provided with an opening and the cup member 37 is formed with a corresponding cavity aligned with the opening to receive a contact pin 41 protruding upwardly from the contact plate 8 which is connected to the lower contact spring 9 of the support. The transverse wall of the upper contact member 33, however, is not perforated and cooperates with the flat contact plate 18. In this way the indicator tube shown in FIG. 4 can be properly inserted between the contact members shown in FIG. 4 only in one way and the contact plates 8 and 18 are to be connected into the control circuit so that the upper cup 35 forms the anode and the lower cup 37 the cathode of the electrolytic circuit. The interior of the cup 35 which forms one of the chambers of the indicator tube 2a is filled with an electrolyte of high concentration and therefore high conductivity, whereas the space in the interior of the tube 34 between the transverse walls of the members 33 and 37, which forms the other chamber of the indicator tube, is filled with an electrolyte of low concentration and therefore low conductivity. As can be seen from FIG. 4 the length of the upper chamber 39 is considerably smaller than the length of the lower chamber 36. In the embodiment shown in FIG. 4 the transverse walls of the members 35 and 37 which are in contact with the electrolyte in the chamber 36 have the same transverse cross sectional area.

The chamber 39 may also include in addition to the electrolyte of high concentration a coloring agent.

FIG. 3 illustrates a slight modification of the support in which an indicator tube as described in the immediately preceding paragraphs may be used. The support 1b illustrated in FIG. 3 differs from the support shown in FIG. 2 by the provision of an additional contact which when the indicator tube 2a is removed from the support closes a circuit to provide an additional signal. For this purpose, the lower cap 10 of the support 1b may be closed by a wall 25 which is formed with an opening 28 through which the lower contact 24 of tube 2a protrudes to make contact with contact plate 8, which when the tube is inserted is moved downwardly from the position shown in

---

+ Any natural or synthetic coloring agent is satisfactory, provided it gives striking appearance and is not decolorized by the electrolyte, preferably alizarine, Supracen, Naphtol HS (both registered trademarks of Farbwerke Bayer), cinnabar, chrome color.

FIG. 3. Connected to an additional contact screw 29 protruding through the rear wall 14 of the support is a contact ring 29 abutting against the bottom face of the plate 28 and formed with a central opening preferably of a slightly larger diameter than the opening 28 and coaxially arranged therewith. The contact screws 21 and 30 are electrically connected to an indicator lamp 32 schematically shown in FIG. 3 which is arranged in the view field of the operator of the machine.

When the indicator tube 2a is removed from the device as illustrated in FIG. 3 the contact spring 9 will press the contact plate 8 against the ring 29 so that current from the control circuit connected to the device will flow from the contact screw 13 through conductor 12, contact spring 9, contact plate 8, the ring 29 to the additional contact screw 30 and from there through the wire 31 through the signal lamp 32 to the contact screw 21 which is connected to the other terminal of the control circuit. The lamp 32 will therefore give a signal that the indicator tube 2a is removed from the control device. Instead of the lamp 32, other similar means may be connected into the aforementioned described additional control circuit, which is closed when the indicator tube 2a is removed from the control device.

The control device shown in FIGS. 2 and 3 will operate as follows: After the indicator tube 2a, which may also be in the specific form as illustrated in FIG. 4, is properly inserted between the contacts of the support and the machine which is to be controlled by the device is in operation so that current will flow through the circuit of which the control device forms a part, which current may for instance be the ignition circuit of an internal combustion engine including a battery 60 and an ignition switch 61 and connected by wires 62 and 63 to the contacts 13 and 21 and also to the interruptor and ignition core of the ignition circuit of the engine, current will flow from the member 35 which forms the anode, to the member 37 which forms the cathode of the electrolytic circuit and this current will slowly electrolytically dissolve the material of the member 35 which will be transported to the member 37 which forms the cathode. After a predetermined number of ampere hours depending upon the thickness of the transverse wall of the member 35, an opening will be formed through this wall which places the chambers 36 and 39 in communication with each other so that the two electrolytes respectively contained in these chambers will mix with each other providing thereby a sudden reduction of the internal resistance of the indicator tube and, when a coloring agent is mixed to the electrolyte contained in the chamber 39 also a change of the color of the electrolyte in chamber 36. When the tube 34 is formed of transparent plastic or other transparent material an optical signal will thereby be produced in the tube, while the reduced resistance may be used to actuate an additional signal means connected into the control circuit. The additional signal means may for instance be an electric lamp 64 included in the control circuit and the brightness of the lamp will be changed when the resistance of the circuit is reduced.

FIG. 5 shows the upper end of a slightly modified indicator tube. The embodiment illustrated in part in FIG. 5 differs from the embodiment discussed in connection with FIG. 4 only by the provision of an insulator plate 41 formed with a central opening 42 and tightly abutting against the bottom face of the transverse wall of the cup-shaped anode 35 by, for instance, being pasted to the bottom face, so that the acting anode surface is restricted to the opening 42 in the center of the plate. The arrangement shown in FIG. 5 may also be slightly modified by providing on the bottom wall of the cup-shaped member 35 a small projection which fills the opening 32. In this way it is possible to obtain even a more exact count of the operating hours of the arrangement.

FIG. 6 shows the upper end of a further modified indicator tube. This modification differs from the modifications described in connection with FIGS. 4 and 5 in that the upper end of the plastic tube 34 extends into abutment with the transverse wall of the upper contact member 33, whereas a flat metal plate 44, made for instance from copper, is set into an annular groove 43 formed in the interior of the tube 34 adjacent but spaced from the upper end thereof. The transverse plate 44 divides the interior of the tube 34 into an upper chamber 39 and a lower chamber 36 having a length considerably greater than that of the upper chamber. The upper chamber 39 is filled with an electrolyte of high concentration, whereas the lower chamber 36 is filled with an electrolyte of low concentration. This arrangment shown in FIG. 6 has to be constructed in such a manner that the contact cap 33 which forms in this arrangement a part of the anode is not dissolved before the plate 44 is electrolytically dissolved and the materials of the members 33 and 44 and the wall thickness thereof have to be chosen respectively to accomplish this result.

In the arrangement shown in FIGS. 4 and 5 only the electrolyte in the chamber 36 is in series with the metal components of the indicator tube, whereas in the arrangement shown in FIG. 6 the electrolyte in the chambers 36 and 39 are in series with the metal components of the indicator tube.

If the voltage of the control circuit to which the control device is connected is held substantially constant during operation of the machine, the control device according to the present invention will operate as meter measuring the hours of operation. It is however also possible to change the voltage in dependence on the load on the machine to be surveyed or to change the voltage depending on the number of revolutions per minute of the machine whereby the control device will operate in dependence on the load or the number of revolutions. For instance the control device of the present invention when used in an automotive vehicle may be constructed to indicate not a predetermined time of operation but to indicate a predetermined number of kilometers through which the vehicle is driven. The adjustment is made in this case in a manner known per se by appropriate choice of a resistance inserted into the control circuit. In most cases it will, however, be preferable to indicate the actual hours of operation since motor vehicles, especially during slow city travel are subjected to much greater wear than during fast travel on highways so that servicing of the motor vehicles at certain time intervals of actual operation will be preferable.

FIG. 7 illustrates a further embodiment of an indicator tube according to the present invention and it is understood that the indicator tube 2b shown in FIG. 7 may be used in a support or housing as shown for instance at 1 in FIG. 1 or at 1a or 1b in FIGS. 2 and 3 respectively.

While in the above described modifications the signal is produced by an electrolytic action of the current flowing through the indicator tube, the indicator tube shown in FIG. 7 is constructed to produce a signal by the thermal action of the current flowing through the indicator tube.

The indicator tube 2b illustrated in FIG. 7 includes a tubular member 3b preferably formed from transparent material such as glass or a transparent plastic which is provided substantially midway between the ends thereof with an annular restriction 52. The upper and lower ends of the tubular member 3b are closed by plugs 5b and 4b respectively which are formed from insulating material. A resistance wire 53 extends longitudinally and preferably through the center of the tubular member 53 and in sealing engagement through the plugs 4b and 5b and contact portions are formed at the outer end of the resistance wire 53 adapted to respectively engage contact plates as shown at 5 and 8 in FIG. 1. The restriction 52 divides the interior of the tubular member 53 in an upper chamber 50 and a lower chamber 51 which communicate with each other through the opening defined by the restriction 52. The upper chamber 50 is filled with a meltable material 54, for instance stearin, which surrounds the upper portion of the resistance wire 53 and which will hide from the observer a marking 56 provided at the rear portion 55 of the tubular member 3b.

When the indicator tube 2b is connected to a control circuit of the machine, in the manner as described before in connection with the other embodiments, current will flow through the resistance wire 53 so that the meltable material 54 in the upper chamber 50 will slowly melt and flow into the lower chamber 51. The restriction 52 provided between the upper and lower chamber will prevent the plug of meltable material 54 from sliding during undesired heating of the tubular member 3b into the lower part thereof without being completely molten. After the meltable material 54 is however completely molten and has flowed into the lower chamber 51, the indicating mark 56 on the rear wall 55 of the tube will become visible to the operator and indicate thereby expiration of the control time.

It is of course possible to make only the upper part or the upper chamber 50 of the indicator tube from transparent material, but it is preferred to make the whole tubular member 3b from transparent material so that the operator may approximately determine from the amount of molten material flowed into the lower chamber 51 what part of the total control time has already expired.

It is also possible to omit the marking 56 on the rear wall 55 of the upper chamber and to color instead the stearin 54 so that the portion which has flowed to the lower chamber is clearly visible.

After all of the stearin 54 in the upper chamber or all of any other meltable material contained therein has flowed to the lower chamber, the indicator tube 2b will be removed from the support and exchanged against a new one as described in connection with the embodiment shown in FIG. 1.

The indicator tube 2b shown in FIG. 7, respectively the support thereof, is connected to a control circuit as described in connection with the preceding embodiments and appropriate resistance may be provided in this control circuit to regulate the flow of current passing through the resistance wire 53 to obtain thereby the signal after a desired time of operation.

It will be understood that each of the elements described above, or two or more together, may also find a useful application in other types of control devices differing from the types described above.

While the invention has been illustrated and described as embodied in a control device for signalling the expiration of a time interval between necessary servicing of a machine, it is not intended to be limited to the details shown since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A control device for signalling the expiration of a time interval between necessary servicing of a machine such as motor vehicle or the like comprising, in combination, an electric circuit adapted to be connected to said machine and to be energized whenever the machine is in operation; a transparent indicator tube of insulating material including a metal component connected to one terminal of the electric circuit and dividing the tube into two chambers, an electrolyte in one of said chambers in contact with said metal component and connected to the other terminal of the circuit, a liquid color in the other of said chambers so that when current flows through the circuit the metal component is gradually electrolytically dissolved so that the two chambers will communicate with each other to suddenly color the eletcrolyte in said one chamber and to provide thereby an optical signal noticeable to the operator of the machine.

2. A control device as set forth in claim 1 in which said metal component is formed from copper.

3. A control device as set forth in claim 1 in which said electrolyte contains a material which discolors slightly during passage of electrical current therethrough.

4. A control device as set forth in claim 1 in which the liquid color contained in the other of said chambers is an aniline color.

5. A control device as set forth in claim 4 in which said metal component is in form of a metal capsule containing said liquid color, said metal capsule having a bottom portion reaching into said one chamber containing the electrolyte.

6. A control device for signalling the expiration of a time interval between necessary servicing of a machine such as motor vehicle or the like comprising, in combination, an indicator tube of transparent material and having opposite open ends; a pair of insulating plugs in said open ends for closing the same; a metal capsule extending through an opening in one of the plugs and having a bottom portion located in the space between said plugs; a liquid coloring material in said capsule; an electrolyte filling the space between said plugs; an electric contact extending through the other plug; and an electric circuit adapted to be connected to said machine and to be energized whenever the machine is in operation and one terminal of the circuit connected to said capsule and the other terminal to said electric contact in such a manner that the capsule forms the anode of the electrolytic circuit formed between said capsule and said electric contact, whereby as current flows through said electric circuit the bottom portion of said capsule will be gradually electrolytically dissolved so that after an opening is thus formed after a predetermined time of current flow through the control device the coloring material in said capsule will mix with the electrolyte to give thereby an optical signal to the operator of the machine indicating the expiration of the time interval between necessary servicing of the machine.

7. A control device for signalling the expiration of a time interval between necessary servicing of a machine such as motor vehicle or the like comprising, in combination, elongated support means of insulating material; a pair of resilient contact means mounted spaced from each other on said support means; an indicator tube of transparent material and having opposite open ends; a pair of insulating plugs in said open ends for closing the same; a metal capsule extending through an opening in one of the plugs and having a bottom portion located in the space between said plugs; a liquid coloring material in said capsule; an electrolyte filling the space between said plugs; an electric contact extending through the other plug, said resilient contact means respectively engaging an outer end of said metal capsule and an outer end of said electrical contact for removably holding said indicator tube on said support means; and an electric circuit adapted to be connected to said machine and to be energized whenever the machine is in operation and one terminal of the circuit connected through one resilient contact means to said capsule and the other terminal through the other resilient contact means to said electric contact in such a manner that the capsule forms the anode of the electrolytic circuit formed between said capsule and said electric contact, whereby as current flows through said electric circuit the bottom portion of said capsule will be gradually electrolytically dissolved so that after an opening is thus formed after a predetermined time of current flow through the control device the coloring material in said capsule will mix with the electrolyte to give thereby an optical signal to the operator of the machine indicating the expiration of the time interval between necessary servicing of the machine.

8. A control device for signalling the expiration of a time interval between necessary servicing of a machine such as a motor vehicle or the like comprising, in combination, an indicator tube of insulating material; a metal component dividing said indicator tube into two chambers; an electrolyte of high concentration and high conductivity in one of the chambers; an electrolyte of low concentration and low conductivity in the other of the chambers; contact means at opposite ends of said tube in contact with said electrolytes, respectively; an electric circuit adapted to be connected to the machine and to be energized whenever the machine is in operation and connecting one terminal of said circuit to one of said contact means and the other terminal to the other of said contact means so that as current flows through said electric circuit said metal component is gradually electrolytically dissolved until said two chambers communicate with each other so that said electrolytes will mix and thereby considerably reduce the resistance of said circuit; and signalling means in said circuit and actuated by the increased current flowing therethrough when the resistance thereof is reduced by the mixing of said electrolytes.

9. A control device as set forth in claim 8 and means in said chamber containing said electrolyte of high concentration to cause during mixing with the other electrolyte a color change in the other electrolyte and in which at least said other chamber is formed from transparent material so that the color change is visible.

10. A control device as set forth in claim 8 in which said two electrolytes are connected in series with said metal component.

11. A control device as set forth in claim 8 in which only one electrolyte is connected in series with said metal component.

12. A control device as set forth in claim 11 in which said one electrolye is said electrolyte of low concentration.

13. A control device as set forth in claim 8 in which said other chamber containing the electrolyte of low concentrate is considerably longer than said one chamber containing the electrolyte of high concentration.

14. A control device for signalling the expiration of a time interval between necessary servicing of a machine such as a motor vehicle or the like comprising, in combination, an indicator tube of insulating material; a metal plate extending transversely through said tube spaced from opposite ends thereof and fluid-tightly connected along a peripheral portion thereto so as to divide the interior of said tube into two chambers; an electrolyte of high concentration and high conductivity in one of the chambers; an electrolyte of low concentration and low conductivity in the other of the chambers; contact means at opposite ends of said tube in contact with said electrolytes, respectively; an electric circuit adapted to be connected to the machine and to be energized whenever the machine is in operation and connecting one terminal of said circuit to one of said contact means and the other terminal to the other of said contact means so that as current flows through said electric circuit said metal component is gradually electrolytically dissolved until said two chambers communicate with each other so that said electrolytes will mix and thereby considerably reduce the resistance of said circuit; and signalling means in said circuit and actuated by the increased current flowing therethrough when the resistance thereof is reduced by the mixing of said electrolytes.

15. A control device for signalling the expiration of a time interval between necessary servicing of a machine such as a motor vehicle or the like comprising, in combination, an indicator tube of insulating material; a cup-shaped metal component extending from one end into said tube and having a bottom portion dividing the tube into two chambers one of which is located in the interior of said cup-shaped metal component and the other of which is located between said bottom portion and the other end of said tube; an electrolyte of high concentration and high conductivity in said one chamber; an electrolyte of low concentration and low conductivity in the other of the chambers; contact means at opposite ends of said tube in contact with said electrolytes, respectively; an electric circuit adapted to be connected to the machine and to be energized whenever the machine is in operation and connecting one terminal of said circuit to one of said contact means and the other terminal to the other of said contact means so that as current flows through said electric circuit said metal component is gradually electrolytically dissolved until said two chambers communicate with each other so that said electrolytes will mix and thereby considerably reduce the resistance of said circuit; and signalling means in said circuit and actuated by the increased current flowing therethrough when the resistance thereof is reduced by the mixing of said electrolytes.

16. A control device as set forth in claim 14 and including an insulating plate abutting against the face of said bottom portion facing the other end of said tube and being formed with a small opening therethrough so that said electrolyte of low concentration contacts only a small area of said bottom portion defined by said opening.

References Cited by the Examiner
UNITED STATES PATENTS

| | | | |
|---|---|---|---|
| 852,539 | 5/1907 | Buchanan | 200—121 |
| 1,422,484 | 7/1922 | Schweitzer | 324—94 |
| 1,689,210 | 10/1928 | McBrien. | |
| 2,655,634 | 10/1953 | Kroko | 324—94 X |
| 2,890,414 | 6/1959 | Snavely | 324—94 X |
| 2,970,264 | 1/1961 | Eriksen | 324—68 X |
| 2,993,169 | 7/1961 | Poyle | 324—68 X |
| 3,041,427 | 6/1962 | Waller | 200—121 |
| 3,046,786 | 7/1962 | Tessem | 324—68 X |
| 3,055,759 | 9/1962 | Busby | 73—356 X |
| 3,090,236 | 5/1963 | Nichol | 73—358 |
| 3,160,869 | 12/1964 | Rambo | 340—263 |

FOREIGN PATENTS

| | | |
|---|---|---|
| 724,970 | 7/1942 | Germany. |

NEIL C. READ, *Primary Examiner.*

R. M. GOLDMAN, *Assistant Examiner.*